United States Patent [19]
Ikeda

[11] Patent Number: 5,784,365
[45] Date of Patent: Jul. 21, 1998

[54] TIME DIVISION MULTIPLEX COMMUNICATION CONTROL SYSTEM

[75] Inventor: Tadashi Ikeda, Tokyo, Japan

[73] Assignee: Mitsubishi Denki Kabushiki Kaisha, Tokyo, Japan

[21] Appl. No.: 607,024

[22] Filed: Feb. 26, 1996

[30] Foreign Application Priority Data

May 25, 1995 [JP] Japan ................................ 7-126272

[51] Int. Cl.[6] .............................. H04J 3/10; H04B 7/212
[52] U.S. Cl. .................................. 370/337; 370/347
[58] Field of Search .......................... 370/321, 326,
370/330, 336, 337, 345, 347, 437, 442,
522; 319/59, 63; 455/33.1, 34.1, 54.1, 63

[56] References Cited

U.S. PATENT DOCUMENTS

| 5,396,496 | 3/1995 | Ito et al. ................................ 370/330 |
| 5,396,649 | 3/1995 | Hamabe ................................ 455/34.1 |
| 5,430,731 | 7/1995 | Umemoto et al. ...................... 370/337 |

FOREIGN PATENT DOCUMENTS

| 6373725 | 4/1988 | Japan . |
| 4111544 | 4/1992 | Japan . |
| 4133531 | 5/1992 | Japan . |

*Primary Examiner*—Hassan Kizou
*Attorney, Agent, or Firm*—Rothwell, Figg, Ernst & Kurz

[57] ABSTRACT

A time division multiplex communication control system for controlling assignment of communication channels from a switching office to mobile stations in which control on the switching office side is automatically effected so that communication channels having a high likelihood of communication disturbances are lastly assigned. In one embodiment, the communication channels located immediately adjacent to the control channel and having a high likelihood of communication disturbances from control channel signals are lastly assigned. In another embodiment in which two carriers are available and the control channel is located in the first carrier, communication channels in the second carrier are first automatically assigned and, when a communication channel is not available in the second carrier, a communication channel is the first carrier which is not adjacent to the control channel is assigned.

20 Claims, 4 Drawing Sheets

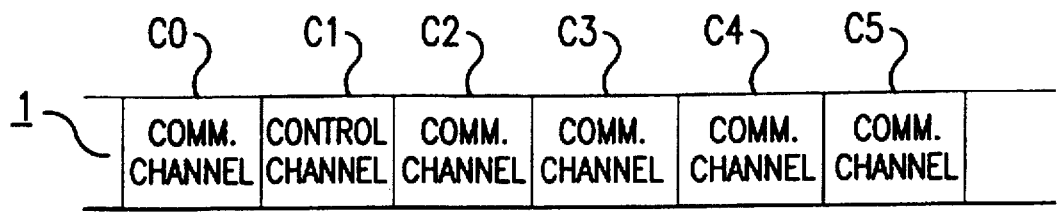
FIG. 1
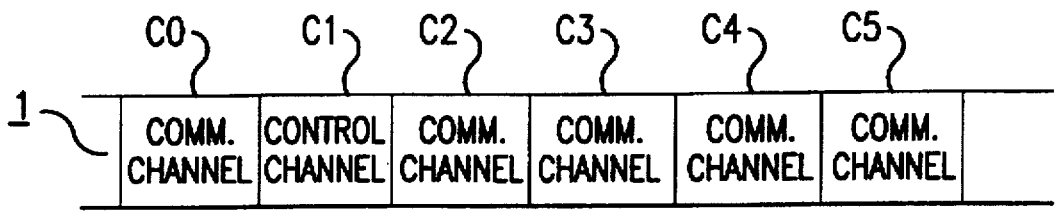
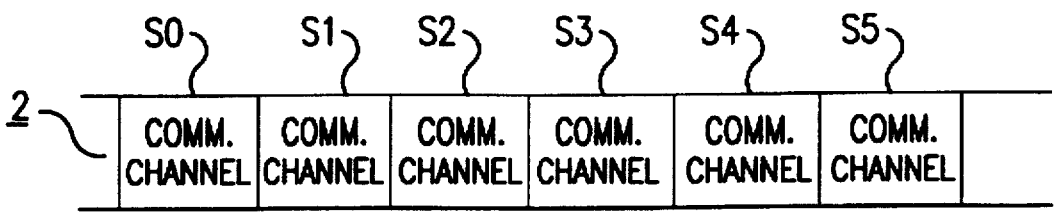
FIG. 3

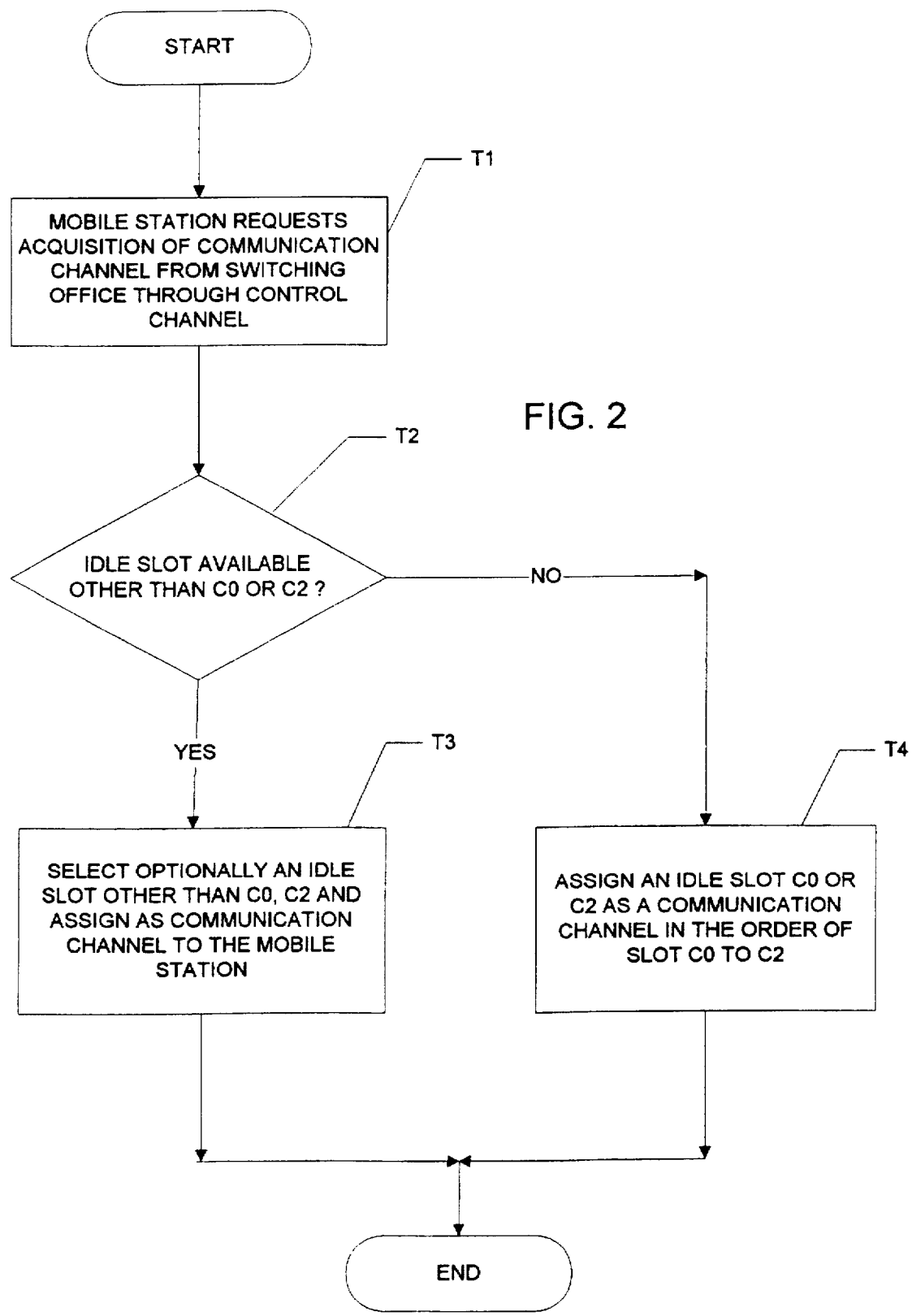

TIME DIVISION MULTIPLEX COMMUNICATION CONTROL SYSTEM

FIELD OF THE INVENTION

The present invention relates to a time division multiplex communication control system for assigning with priority a communication channel of high line quality to a mobile station in a system using a radio channel such as a time division multiple access (TDMA).

DESCRIPTION OF THE RELATED ART

A conventional time division multiplex communication control system is hereinafter explained.

FIG. 5 is an explanatory view showing a communication state between a switching office and mobile stations. In the drawing, reference numeral 10 denotes a switching office and numerals 20a, 20b, ... 20n denote a plurality of mobile stations. FIG. 6 is an explanatory diagram to explain the order of assigning communication channels in a conventional TDMA system. In FIG. 6, reference numeral 1 denotes a carrier used by the switching office 10, numerals C0, C1 ... C5 denote slots forming the carrier 1. It is herein supposed, for purposes of example, that the slot C1 is a control channel and the remaining slots C0, C2, C3, C4 and C5 are communication channels, and that only one carrier is used in the switching office 10 and a multiplex number is six.

Operation of the above conventional system is hereinafter described. When an acquisition of a communication channel is requested by a mobile station to the switching office 10 using the control channel (slot C1), the switching office 10 checks for busy communication channels, and when no communication channel is busy, the switching office 10 assigns a communication channel (slot C0) immediately before the control channel (slot C1). Then, when acquisition of a communication channel is requested by another mobile station 20b, the switching office 10 assigns a communication channel (slot C2) which is not busy.

Further, when acquisition of a communication channel is requested from a further mobile station 20c, the switching office assigns a communication channel (slot C3).

Under the condition of completing the above assignments, when an acquisition of a communication channel is further requested by a mobile station 20d, the switching office 10 assigns a communication channel (slot C4) to the mobile station 20d.

When acquisition of a communication channel is still further requested from a mobile station 20e, the switching station 10 assigns a last communication channel (slot C5). The foregoing is the manner of assignment in the conventional system.

Furthermore, when any communication takes place using a plurality of communication channels, assignment order of the communication channels is decided without considering the influence of the control channel C1.

In the conventional time division multiplex communication control system as described above, there are some problems created which will be described as follows.

In the aforementioned conventional time division multiplex communication control system,in case of performing a time division multiple access, since the communication channel (slots C0, C2, ... C5) are assigned at random, the channels located immediately adjacent to the control channel (slot C1) to be used at random by plural mobile stations 20 are also assigned at random. Since the control channel (slot C1) is a channel to which call signals, etc. from the mobile stations 20 access at random, there arises a time lag when respective radio waves reach the switching office 10 depending upon the location of the individual mobile stations 20, thereby causing a propagation delay, and the control channel (slot C1) interferes with the adjacent communication channels (slots C0, C2), to exert an undesirable influence upon them. As a result, there is a high likelihood that a mobile station 20, to which a communication channel (slot C0 or C2) located immediately adjacent to the control channel (slot C1) is assigned, will suffer communication disturbances at all times thereby resulting in communication difficulties.

SUMMARY OF THE INVENTION

The present invention is directed to solving the above discussed problems and it is an object of the invention to provide a time division multiplex communication control system capable of controlling the switching office 10 side of the radio system so that the communication channels (slots C0, C2) located immediately adjacent to the control channel (slot C1), which have a high likelihood of suffering communication disturbances, are assigned to mobile stations only after all other communication channels already have been assigned.

Another object of the invention is to provide a time division multiplex communication control system capable of assigning with priority a communication channel of high communication quality, by providing a function of assigning a communication channel optionally or in order running from either a small number or a large number except for the communication channels located immediately adjacent to the control channel, thereby employing to the utmost communication channels other than the communication channels located immediately adjacent to the control channel, which have a high likelihood of suffering communication disturbances.

To achieve the foregoing and other objectives, and in accordance with the purposes of the present invention, there is provided a time division multiplex communication control system in which a switching office assigns a communication channel to the mobile station using a carrier having a control channel through which a mobile station requests acquisition of a communication channel and a plurality of communication channels controlled by information of said control channel, characterized in that when said mobile station requests the acquisition of a communication channel from said switching office through said control channel, said switching office assigns to said mobile station with priority a communication channel not adjacent to said control channel.

According to another aspect of the invention, there is provided a time division multiplex communication control system in which a switching office assigns a communication channel to a mobile channel using a first carrier having a control channel through which a mobile station requests acquisition of a communication channel and a plurality of communication channels controlled by said control channel, and a second carrier comprised of a plurality of communication channels, characterized in that when said mobile station requests the acquisition of a communication channel from said switching office through said control channel, said switching office assigns with priority a communication channel of said second carrier to said mobile station, and when the communication channel of said second carrier is congested, said switching office assigns to said mobile station with priority a communication channel of said first carrier not adjacent to said control channel of said first carrier.

According to a further aspect of the invention, there is provided a time division multiplex communication control system, wherein at least one of the communication channels located immediately adjacent to the control channel is not assigned.

According to a further aspect of the invention, there is provided a time division multiplex communication control system, wherein the communication channel located immediately after the control channel is not assigned.

According to a further aspect of the invention, there is provided a time division multiplex communication control system, wherein a communication channel to be assigned with priority on the same carrier is optionally assigned.

According to a further aspect of the invention, there is provided a time division multiplex communication control system, wherein a communication channel to be assigned with priority on the same carrier is assigned in an ascending order commencing with a small communication channel number.

According to a further aspect of the invention, there is provided a time division multiplex communication control system, wherein a communication channel to be assigned with priority on the same carrier is assigned in a descending order commencing with a large communication channel number.

According to a still further aspect of the invention, there is provided a time division multiplex communication control system, wherein the communication channel located immediately after the control channel is lastly assigned.

BRIEF DESCRIPTION OF THE DRAWINGS

The invention disclosed herein will be better understood with reference to the following drawings, of which:

FIG. 1 is an exemplary view for explaining the order of assigning communication channels in the time division multiplex communication control system according to the present invention;

FIG. 2 is a flow chart showing the time division multiplex communication control system according to the first embodiment of the invention;

FIG. 3 is an explanatory diagram for explaining the order of assigning communication channels in the time division multiplex communication control system according to the second embodiment of the invention;

DESCRIPTION OF THE PREFERRED EMBODIMENTS

Figure 4:
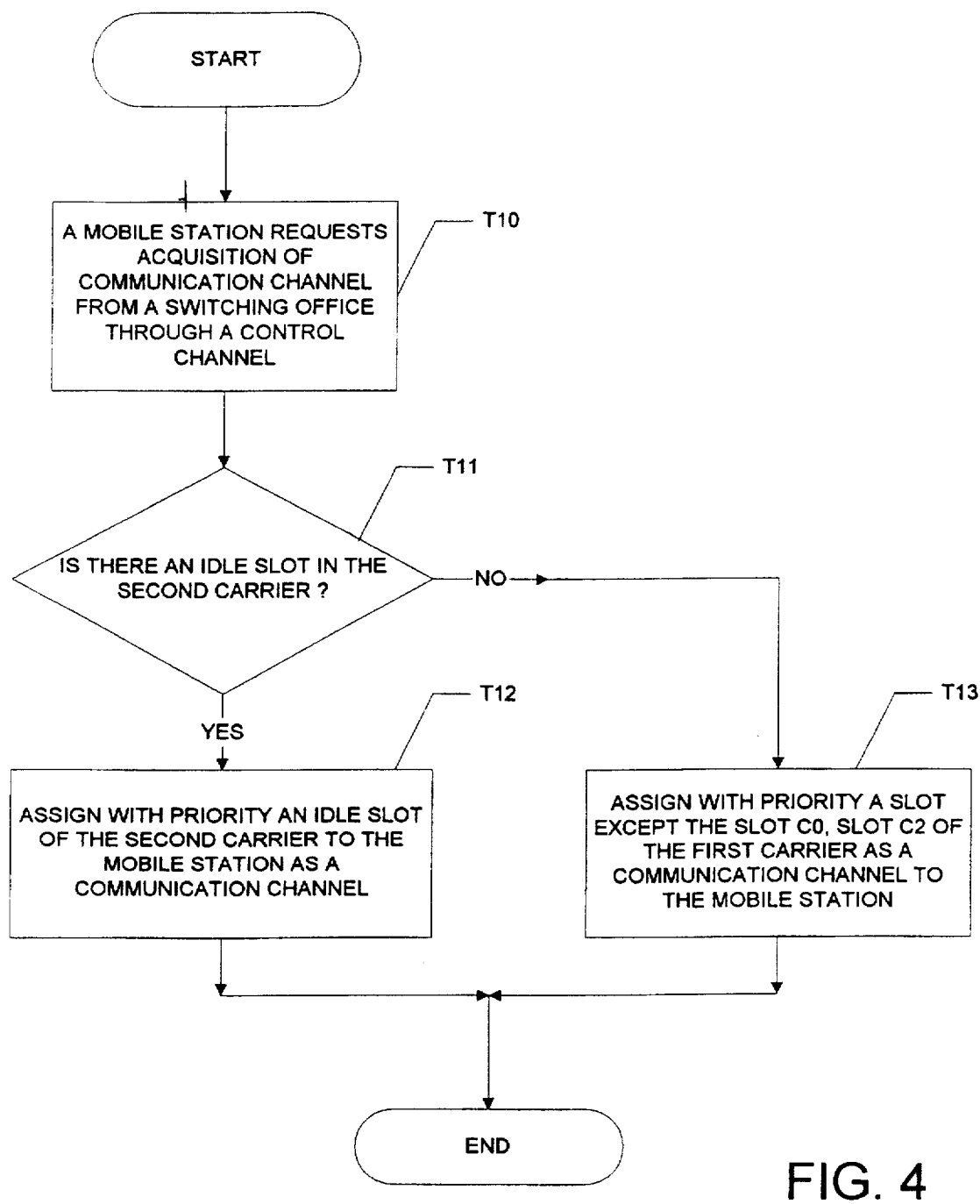
FIG. 4 is a flow chart showing the time division multiplex communication control system according to the first embodiment of the invention.
Figure 5:
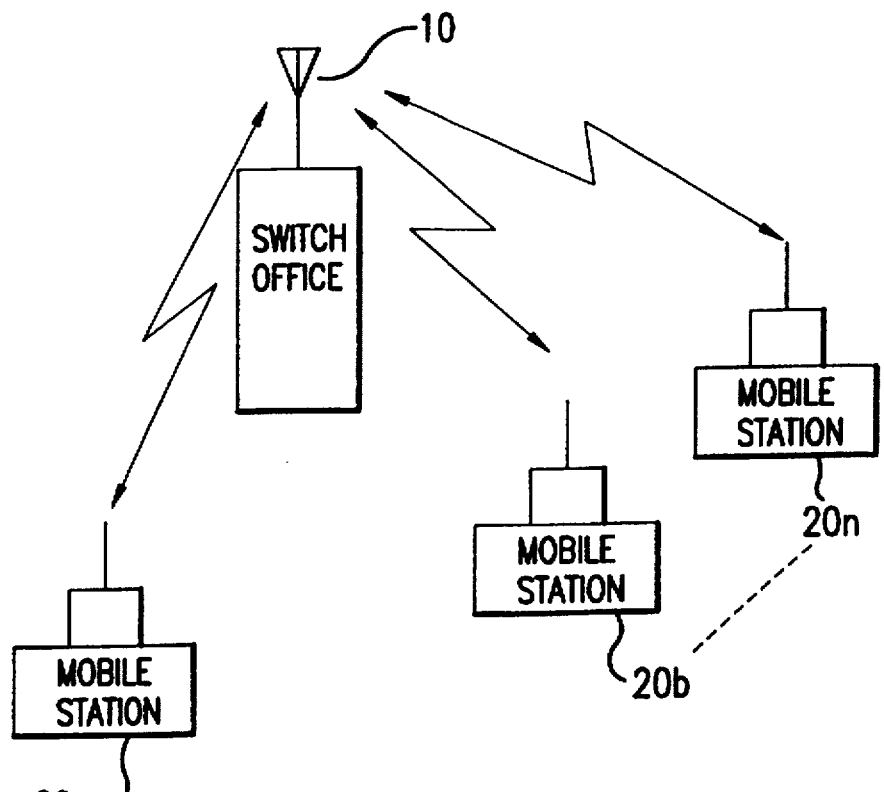
FIG. 5 is an explanatory view showing a communication state between a switching office and mobile stations.
Figure 6:
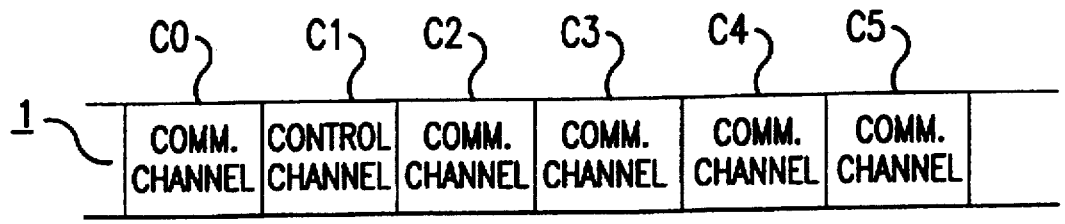
FIG. 6 is an explanatory diagram for explaining the order of assigning communication channels in the conventional time division multiplex communication control system.

An example according to the present invention is hereinafter described with reference to the drawings.

FIG. 1 is an explanatory view which is used for explaining the order of assigning communication channels in the time division multiplex communication control system according to the present invention. In FIG. 1, reference numeral 1 indicates a time slot pattern of a carrier including a control channel, and in which numerals C0, C1, ... C5 indicate physical numbers of the slots and in which slot C1 is the control channel, slot C0 is a communication channel located immediately before the control channel, slot C2 is a communication channel located immediately after the control channel, and C3, C4, and C5 are respectively communication channels to be assigned with priority over channels C0 and C2.

Operation of the system of this example will now be described with reference to the drawings. FIG. 2 is a flow chart showing a time division multiplex communication control system operation according to one embodiment of the present invention. It is supposed in this example that only one carrier is used and the multiplex number is six. Any other multiplex number can exhibit the same advantage, although it is herein supposed to be six for convenience of explanation. First, when the acquisition of a communication channel is requested by any mobile station 20 to the switching 10 using the control channel (slot C1)(Step T1), the switching office 10 checks for busy communication channels, and when it is found out that no communication channel is busy, the switching office 10 selects optionally any idle slot except for the communication channels (slots C0, C2) located immediately before and behind the control channel (C1) and assigns the selected slot as a communication channel to the mobile station (Step T3). Thus, in step T2, it is determined if an idle slot other than slots C0 or C2 is available. If an idle slot other than slots C0 or C2 is available, then a selected idle slot other than C0 or C2 is assigned. For example, a communication channel (slot C3) is assigned.

Then, when acquisition of a communication channel is requested by another mobile station 20, the switching office 10 selects optionally a communication channel not busy other than the slots C0 and C2, and assigns the selected communication channel in the same manner as just described. For example, communication channel (slot C5) is assigned in (Step T3). When acquisition of a communication channel is requested by a further mobile station 20, the switching office 10 assigns a communication channel (slot C4) other than the communication channel (slots C0, C2) located immediately before and behind the control channel (C1) (Step T3), and when acquisition of a communication channel is further requested by a further mobile station 20, a communication channel (slot C5) is assigned (Step T3).

Under the condition of completing the above assignments, when the acquisition of a communication channel is further requested by a further mobile station 20, the switching office 10 recognizes that all communication channels are busy, except for C0 and C2 on either side of the control channel C1 (Step T2), and assigns the communication channel (slot C0) located immediately before the control channel (slot C1) to the mobile station 20 (Step T4). The order of assignment in step T4 is thus C0 first and then C2.

When acquisition of a communication channel is still further requested from a further mobile station 20, the switching office 10 assigns a communication channel (slot C2) located immediately after the control channel (slot C1) (Step T4). However, if the mobile station 20 engaging another communication channel has disengaged prior to such assignment of the communication channel located immediately after the control channel (slot C1), the switching office 10 does not assign the communication channel located immediately behind the control channel (C1)(Step T2), but assigns the communication channel just disengaged and thus now idle (Step T4).

As described above, the switching office 10 operates, on the switching office 10 side of the radio system, so that the communication channels (slots C0, C2) located immediately before and behind the control channel (C1), which have a high likelihood of suffering communication disturbances, are lastly assigned, and communication channels of high communication quality without the likelihood of suffering communication disturbances are thus assigned with priority to the mobile station 20.

Thus, the communication channels (slots C0, C2) located immediately before and after the control channel (C1) are lastly selected. However, it is preferable that the communication channel (slot C2) is lastly selected among all channels because the communication channel (slot C2) is most likely to suffer propagation delays due to the control channel (slot C1).

Although the communication channels (slots C3, C4, C5), except for the communication channels (slot C0, C2) located immediately before and after the control channel (slot C1), can be optionally selected in any order, a further advantage can be also exhibited by selecting and assigning them in ascending order from small to large slot numbers.

Further, by avoiding at least one of the slots C0, C2 being assigned to the mobile station 20, an advantage is exhibited such that only the communication channels free from disturbances from the control channel (slot C1) are assigned. When the highest level of quality is desired, it is preferable that the communication channel (slot C2) most likely to suffer the deleterious influence of the control channel (slot C1) is not used at all.

Described hereinafter is another example of the time division multiplex communication control system according to the invention. FIG. 3 is an explanatory diagram used to explain the order of assigning communication channels in the time division multiplex communication control system of this example. In FIG. 3, reference number 1 indicates a time slot pattern of a first carrier having a control channel, which is the same as that shown in FIG. 1, and in which the same reference numerals are designated for the same parts. Numeral 2 indicates a time slot pattern of a second carrier having no control channel, and S0, S1, ... S5 indicate slots serving as communication channels.

Operation of the system of this example will now be described with reference to the drawings. FIG. 4 is a flow chart showing a time division multiplex communication control system according to this example. In the first step, the mobile station 20 requests the switching office 10 to assign a communication channel through the control channel (slot C1) (Step T10), and the switching office 10 searches whether or not there is any idle slot in the second carrier 2 (Step T11). If it is determined that there is an idle slot in the second carrier 2, the switching office 10 selects optionally an idle slot of the second carrier 2 and assigns it to the mobile station 10 as a communication channel (Step T12). If it is determined that there is no idle slot in the second carrier 2, the switching office 10 selects optionally any slot of the first carrier other than the slots C0 and C2 and assigns it to the mobile station 20 as a communication channel (Step T13).

As described above, on the side of the switching office 10, any slot of the second carrier having no control channel is first assigned with priority to the mobile station 20 as a communication channel, and when there is no idle slot in the second carrier, the switching office 10 controls the first carrier so that any slot except the slots C0, C2 located immediately before and after the control channel (slot C1), which have a high likelihood of suffering communication disturbances, is assigned with priority as a communication channel. As a result, a communication channel of high communication quality without the likelihood of suffering communication disturbances is assigned with priority to the mobile station 20.

Either of the communication channels (slots C0, C2) located immediately before and after the control channel (C1) can be lastly selected. However, it is preferable that the communication channel (slot C2) is lastly selected because the communication channel (slot C2) is most likely to suffer propagation delays due to the control channel (slot C1).

Although the communication channels (slots C3, C4, C5) other than the communication channels (slots C0, C2) located immediately before and after the control channel (slot C1) can be optionally selected in any order, a further advantage can be also realized by selecting and assigning them in ascending order from small slot numbers to large slot numbers.

Further, by avoiding assignment at least one of the slots C0, C2 of the first carrier to the mobile station 20, an advantage is attained in that only communication channels free from communication disturbances from the control channel (slot C1) are assigned. Where the highest quality is desired, it is preferable that the slot C2 most likely to suffer adverse influence from the control channel (slot C1) not be assigned at all.

In summary, the time division multiplex communication control system according to the present invention functions as follows.

In the communication control system of the present invention, when a mobile station requests acquisition of a communication channel from a switching office through a control channel, the switching office assigns with priority to the mobile station a communication channel not adjacent to the control channel.

In another embodiment, when a mobile station requests acquisition of a communication channel from a switching office through a control channel, the switching office assigns to the mobile station with priority a communication channel of a second carrier, and when the communication channel of the second carrier is congested and is not available, the switching office assigns to the mobile station with priority a communication channel of the first carrier not adjacent to the control channel of the first carrier.

In another embodiment, at least one of the communication channels located immediately before and behind the control channel is not assigned at all.

In another embodiment, the communication channel located immediately after the control channel is not assigned at all.

In another embodiment, the speech channel assigned with priority relative to other channels on the same carrier can be optionally selected in any order or at random.

In another embodiment, the speech channel assigned with priority on the same carrier is assigned in ascending order beginning with the small speech channel number.

In another embodiment, the speech channel assigned with priority on the same carrier is assigned in descending order beginning with the large speech channel number.

In another embodiment, the communication channel located immediately after the control channel is lastly assigned.

As has been described thus far, in the time division multiplex communication control system according to the present invention, an advantage is attained in that when a mobile station requests acquisition of a communication channel from a switching office through a control channel, the switching office assigns to the mobile station with priority a communication channel not adjacent to the control channel, whereby not only can every mobile station which is a subscriber to the radio system acquire automatically an assignment of a communication channel through a high communication quality line, but also communication disturbances due to the control channel signal on the switching office side can be minimized.

In the time division multiplex communication control system according to another embodiment, an advantage is attained in that when a mobile station requests acquisition of a communication channel from a switching office through a control channel, the switching assigns to the mobile station with priority a communication channel of a second carrier, and when the communication channels of the second carrier are congested, the switching office assigns to the mobile station with priority a communication channel not adjacent to the control channel of the first carrier, whereby every mobile station which is a subscriber to the radio system can acquire automatically an assignment of a communication channel through a high communication quality line of the second carrier, and in case of congestion of the communication channels of the second carrier, the mobile station can acquire an assignment of a communication channel through a high communication quality line of the first carrier, and, as a result, not only average occupancy is improved but also communication disturbances due to the control channel signal on the switching office side can be minimized.

In the time division multiplex communication control system according to a further embodiment, since at least one of the communication channels located immediately before and behind the control channel is not assigned, an advantage is attained in that communication disturbances due to the control channel signal on the switching office side can be minimized.

In the time division multiplex communication control system according to a further embodiment, when the communication channel located immediately after the control channel is not assigned at all, it is possible to avoid assignment of the communication channel most likely to suffer communication disturbances due to the control channel signal, and therefore a further advantage is realized in that only communication lines of stable quality are provided.

In the time division multiplex communication control system according to a further embodiment, the speech channel on the same carrier is optionally assigned, and therefore an advantage is attained in that every mobile station which is a subscriber to the radio system can acquire automatically an assignment of a communication channel through a high quality line.

In the time division multiplex communication control system according to a further embodiment, the speech channel assigned with priority on the same carrier is assigned in ascending order beginning with the small speech channel number, and an advantage is attained in that every mobile station which is a subscriber to the speech system on the same carrier can automatically acquire an assignment of a communication channel through a high communication quality line.

In the time division multiplex communication control system according to a further embodiment, when the speech channel assigned with priority on the same carrier is assigned in descending order beginning with the large speech channel number, an advantage is attained in that every mobile station which is a subscriber of a speech system on the same carrier can automatically acquire an assignment of a communication channel through a high communication quality line.

The assignment of the channels in ascending or descending order beginning with the smallest or largest channel number, respectively, provides further advantages in that the sequence is simple and avoids confusion in allotting the channels and also simplifies the logic for confirming the functions and controlling the operations of the system.

In the time division multiplex communication control system according to a further embodiment, when the communication channel located immediately after the control channel is lastly assigned, an advantage is attained in that the probability of assigning the communication channel most likely to suffer communication disturbances due to the control signal is reduced, and a communication line of stable quality can be assigned with priority.

It is further understood that the foregoing description is of preferred embodiments of the present invention and that various changes and modifications can be made without departing from the spirit and scope thereof.

What is claimed is:

1. A time division multiplex communication control system comprising a switching office and a plurality of mobile stations, wherein communication signals are sent over at least one carrier having a plurality of time division multiplexed communication channels and a control channel, in which said switching office assigns a communication channel to a mobile station requesting acquisition of a communication channel through said control channel, characterized in that when said mobile station requests the acquisition of a communication channel from said switching office through said control channel, said switching office assigns to said mobile station a communication channel which is not adjacent to said control channel with priority over a communication channel which is adjacent to said control channel.

2. A time division multiplex communication control system according to claim 1, wherein at least one of the communication channels located immediately adjacent to the control channel is not assigned to any mobile station.

3. A time division multiplex communication control system according to claim 2, wherein a communication channel to be assigned with priority over other communication channels is on the same carrier as said other communication channels.

4. A time division multiplex communication control system according to claim 3, wherein the communication channel to be assigned with priority on the same carrier is assigned in ascending order from a small communication channel number.

5. A time division multiplex communication control system according to claim 3, wherein the communication channel to be assigned with priority on the same carrier is assigned in descending order from a large communication channel number.

6. A time division multiplex communication control system according to claim 1, wherein the communication channel located immediately after the control signal channel is not assigned to any mobile station.

7. A time division multiplex communication control system according to claim 1, wherein a communication channel to be assigned with priority over other communication channels is on the same carrier as said other communication channels.

8. A time division multiplex communication control system according to claim 7, wherein a communication channel to be assigned with priority on the same carrier is assigned in ascending order from a small communication channel number.

9. A time division multiplex communication control system according to claim 7, wherein a communication channel to be assigned with priority on the same carrier is assigned in descending order from a large communication channel number.

10. A time division multiplex communication control system according to claim 1, wherein the communication channel located immediately after the control channel is assigned only after all other communication channels have been assigned to mobile stations.

11. A time division multiplex communication control system comprising a switching office and a plurality of mobile stations, wherein communication signals are sent over at least two carriers, each having a plurality of time division multiplexed communication channels and wherein a first carrier has a control channel, in which a switching office assigns a communication channel to a mobile station requesting acquisition of a communication channel through a control channel of said first carrier, characterized in that when said mobile station requests the acquisition of a communication channel from said switching office through said control channel, said switching office assigns to said mobile station a communication channel of said second carrier with priority over communication channels of said first carrier, and when a communication channel of said second carrier is not available, said switching office assigns to said mobile station a communication channel of said first carrier not adjacent to said control channel of said first carrier with priority over a communication channel which is adjacent to said control channel.

12. A time division multiplex communication control system according to claim 11, wherein at least one of the communication channels of said first carrier located immediately before and after the control channel is not assigned to any mobile station.

13. A time division multiplex communication control system according to claim 12, wherein a communication channel to be assigned with priority over other communication channels is on the same carrier as said other communication channels.

14. A time division multiplex communication control system according to claim 13, wherein the communication channel to be assigned with priority on the same carrier is assigned in ascending order from a small communication channel number.

15. A time division multiplex communication control system according to claim 13, wherein a communication channel to be assigned with priority on the same carrier is assigned in descending order from a large communication channel number.

16. A time division multiplex communication control system according to claim 11, wherein the communication channel of said first carrier located immediately after the control channel is not assigned to any mobile station.

17. A time division multiplex communication control system according to claim 11, wherein a communication channel to be assigned with priority over other communication channels is on the same carrier as said other communication channels.

18. A time division multiplex communication control system according to claim 17, wherein a communication channel to be assigned with priority on the same carrier is assigned in ascending order from a small communication channel number.

19. A time division multiplex communication control system according to claim 17, wherein a communication channel to be assigned with priority on the same carrier is assigned in descending order from a large communication channel number.

20. A time division multiplex communication control system according to claim 11, wherein the communication channel of said first carrier located immediately after the control channel is assigned only after all other communication channels have been assigned to mobile stations.

* * * * *